INVENTOR.
Albert F. Tremblay
BY
Owen & Owen
ATTORNEYS

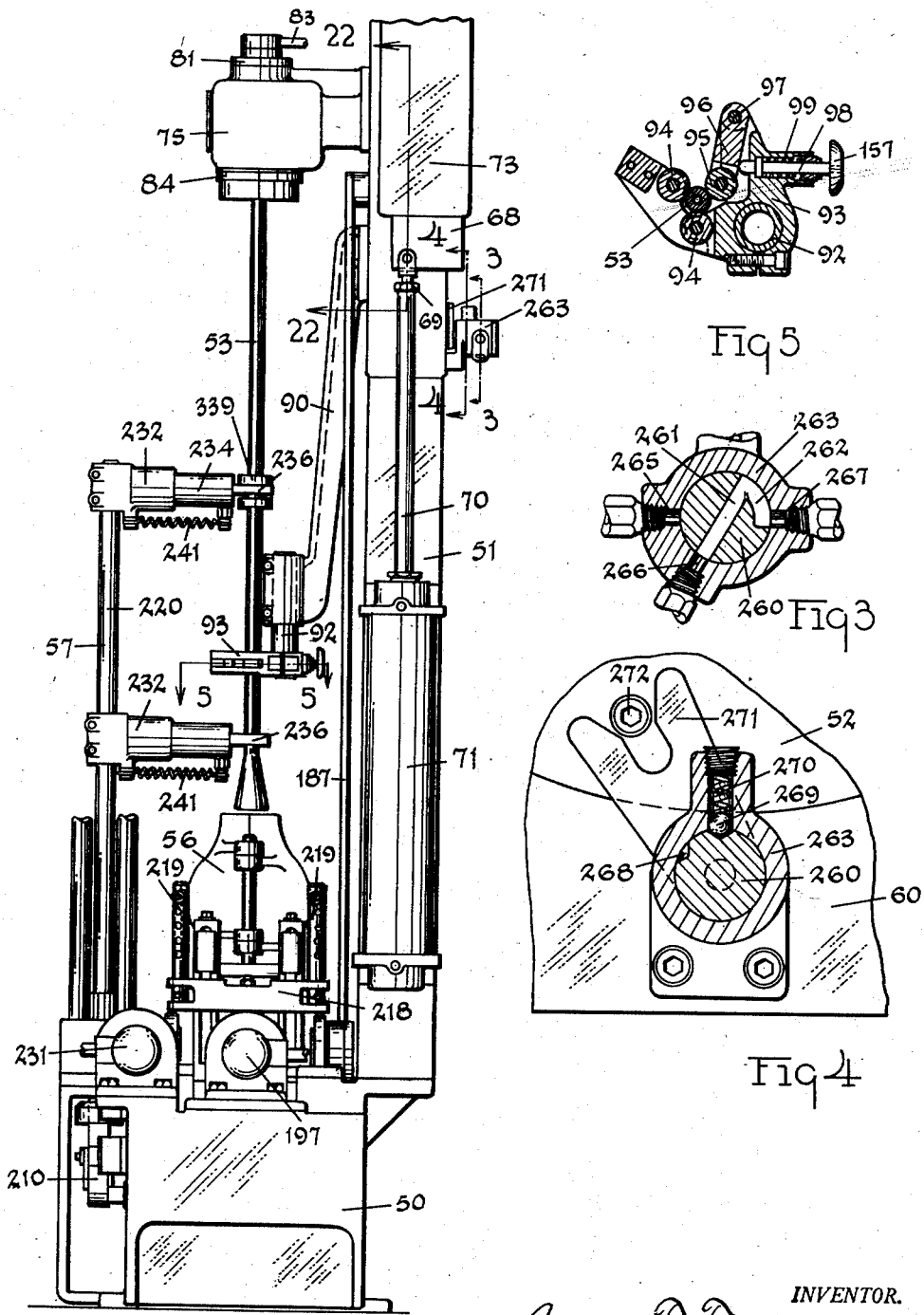

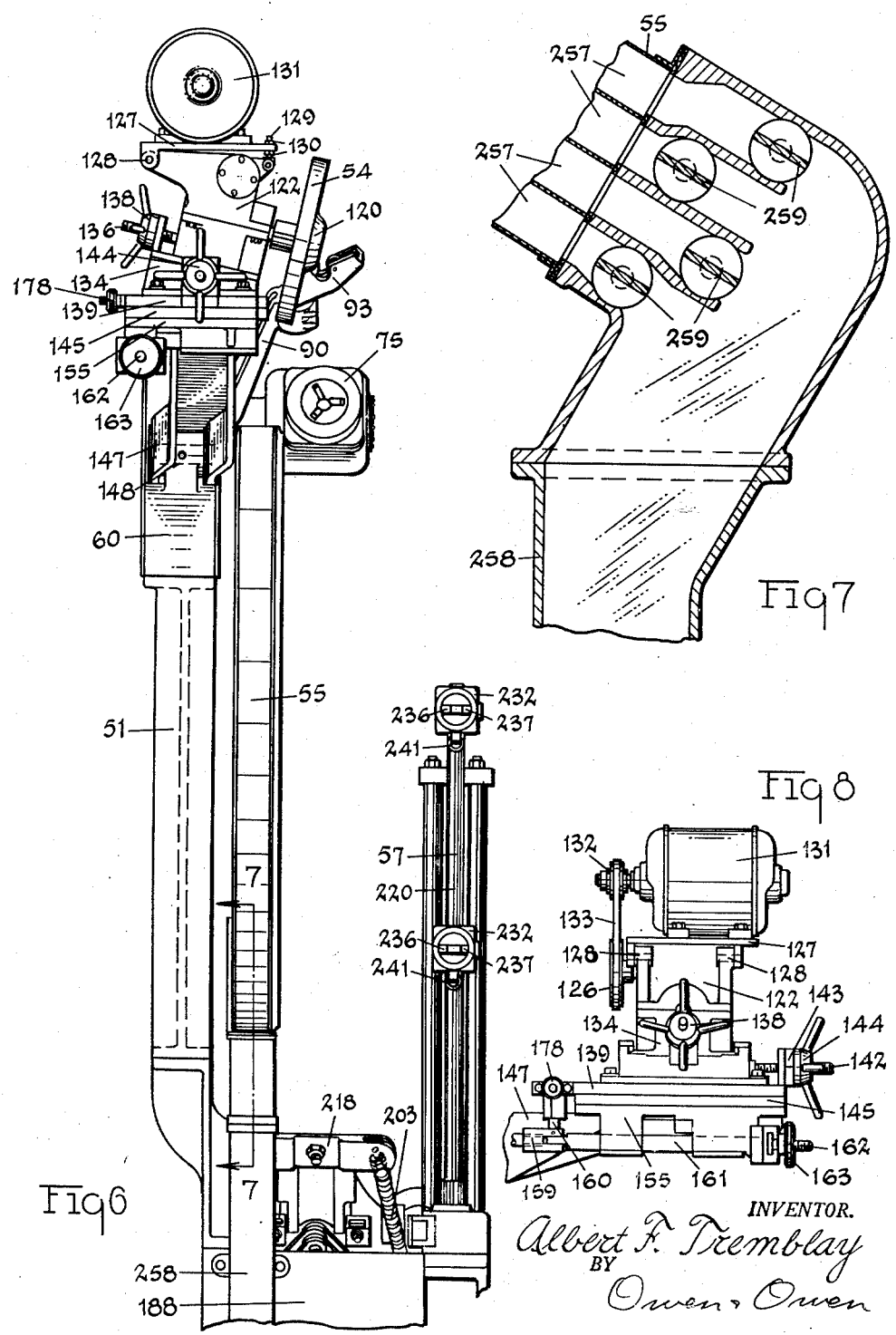

Dec. 25, 1951  A. F. TREMBLAY  2,579,628
GLASS BLOWING APPARATUS
Filed Oct. 18, 1945  16 Sheets-Sheet 5

INVENTOR.
Albert F. Tremblay
BY
Owen e Owen
ATTORNEYS

Dec. 25, 1951  A. F. TREMBLAY  2,579,628
GLASS BLOWING APPARATUS
Filed Oct. 18, 1945  16 Sheets-Sheet 7

INVENTOR.
Albert F. Tremblay
BY
Owen & Owen
ATTORNEYS

INVENTOR.
Albert F. Tremblay
BY
Owen e Owen
ATTORNEYS

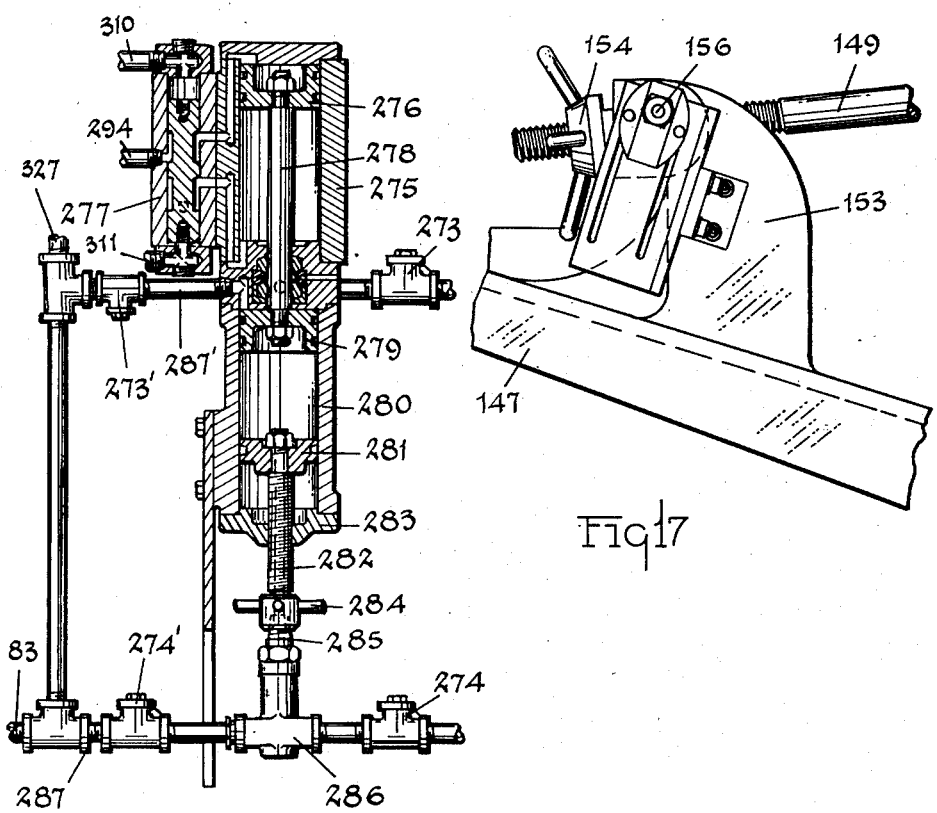

Dec. 25, 1951     A. F. TREMBLAY     2,579,628
GLASS BLOWING APPARATUS
Filed Oct. 18, 1945     16 Sheets-Sheet 10
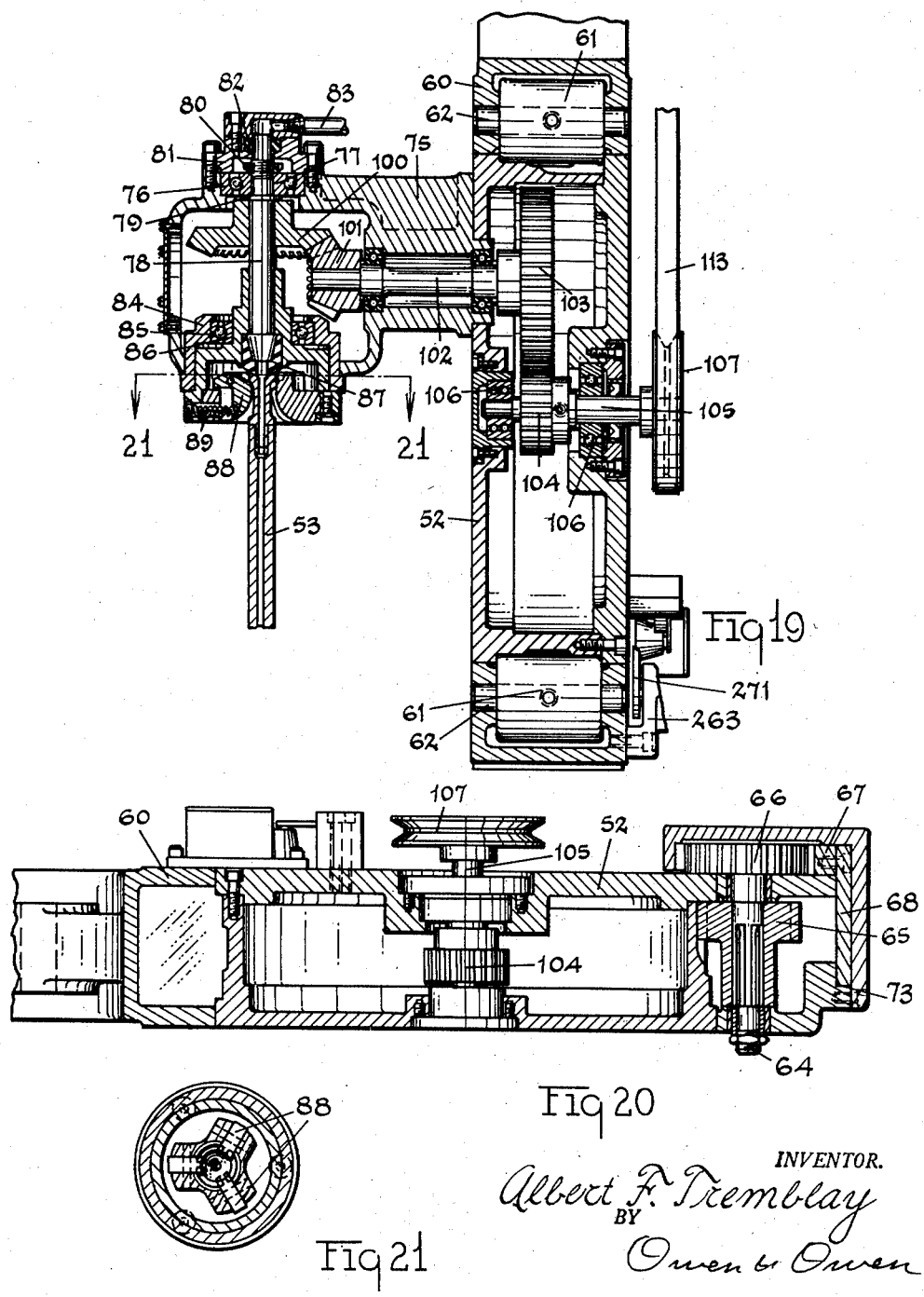
INVENTOR.
Albert F. Tremblay
BY Owen & Owen
ATTORNEYS Dec. 25, 1951  A. F. TREMBLAY  2,579,628
GLASS BLOWING APPARATUS
Filed Oct. 18, 1945  16 Sheets-Sheet 11
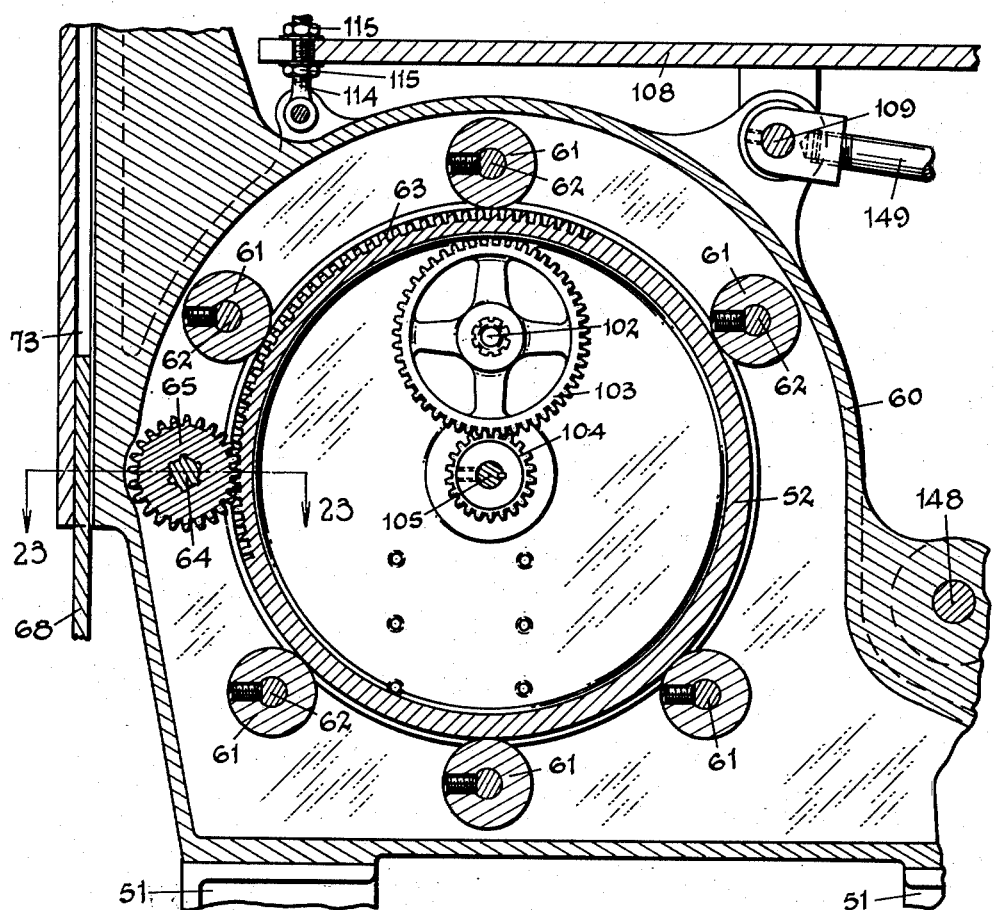
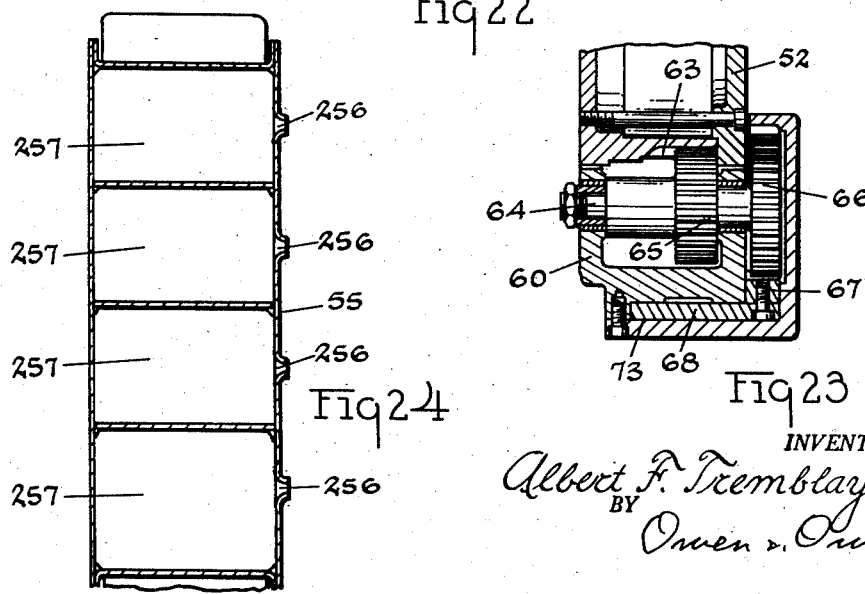
INVENTOR.
Albert F. Tremblay
BY
Owen & Owen
ATTORNEYS

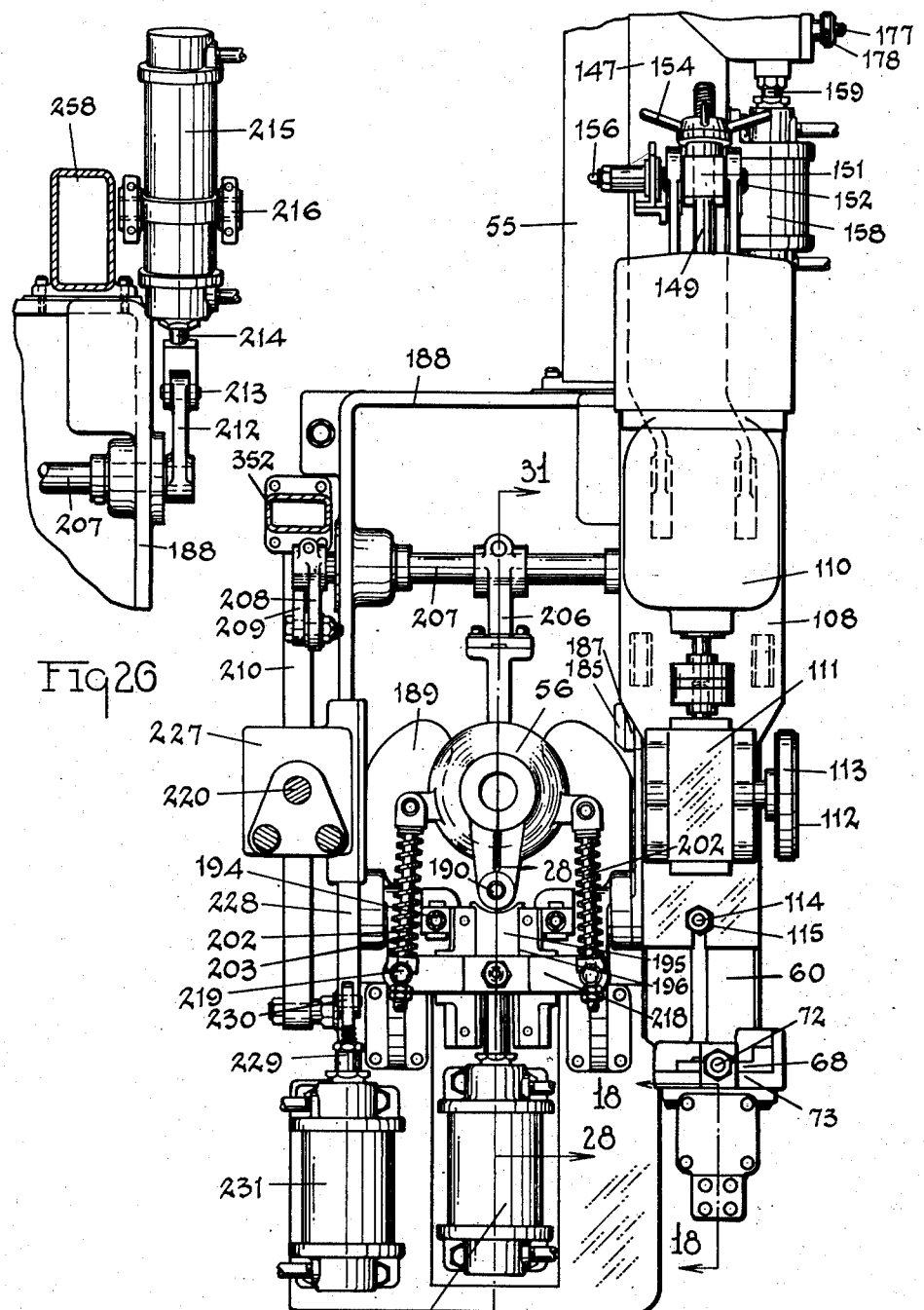

Dec. 25, 1951  A. F. TREMBLAY  2,579,628
GLASS BLOWING APPARATUS
Filed Oct. 18, 1945  16 Sheets-Sheet 13
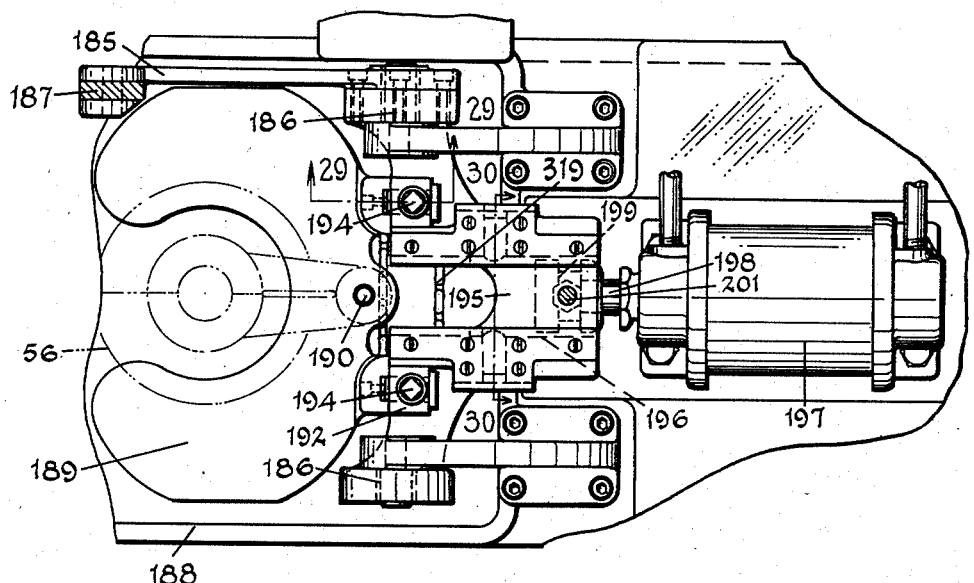
Fig 27
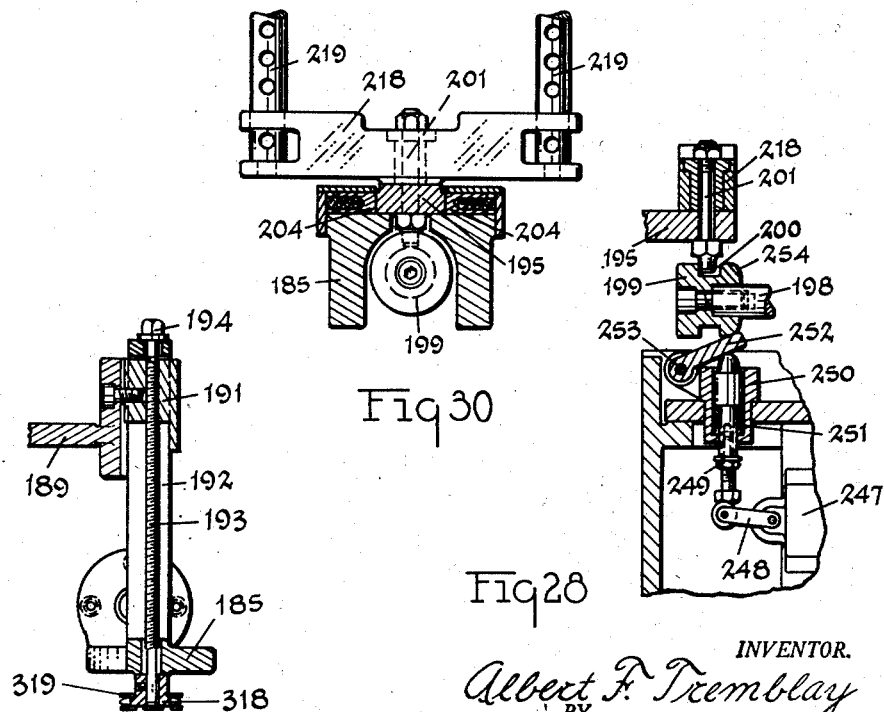
Fig 30  Fig 28
Fig 29
INVENTOR.
Albert F. Tremblay
BY
Owen & Owen
ATTORNEYS Dec. 25, 1951     A. F. TREMBLAY     2,579,628
GLASS BLOWING APPARATUS Filed Oct. 18, 1945     16 Sheets-Sheet 14

INVENTOR.
Albert F. Tremblay
BY
Owen & Owen
ATTORNEYS

Dec. 25, 1951 A. F. TREMBLAY 2,579,628
GLASS BLOWING APPARATUS
Filed Oct. 18, 1945 16 Sheets-Sheet 15
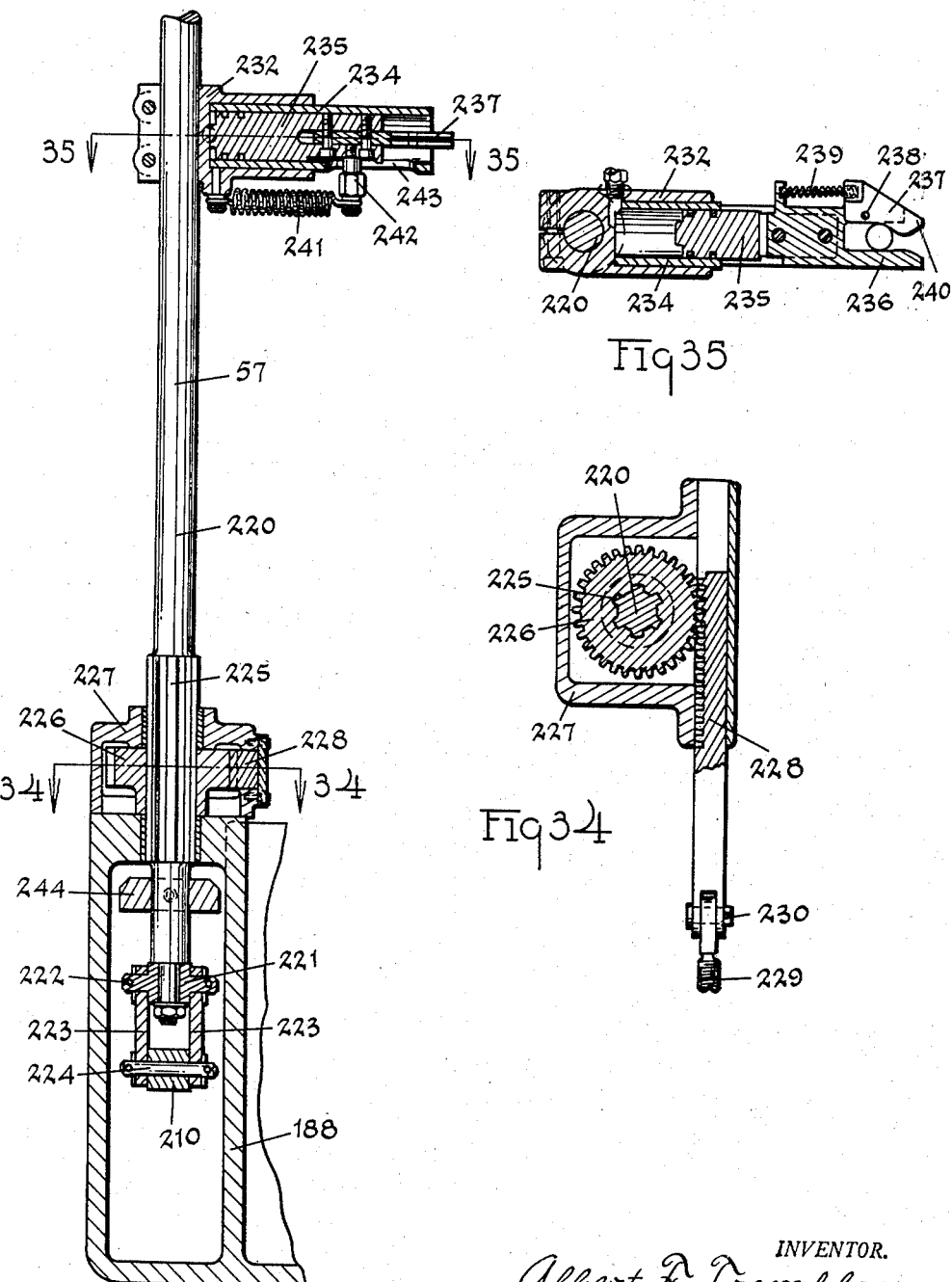

Patented Dec. 25, 1951

2,579,628

UNITED STATES PATENT OFFICE 2,579,628

GLASS BLOWING APPARATUS

Albert F. Tremblay, Toledo, Ohio, assignor to Kent-Owens Machine Company, Toledo, Ohio, a corporation of Ohio Application October 18, 1945, Serial No. 623,111

15 Claims. (Cl. 49—20)

This invention relates to apparatus for blowing glass. More particularly it relates to the type of glass blowing apparatus known as semi-automatic, and to certain steps connected with the blowing of glass by the semi-automatic method.

In the semi-automatic method of blowing glass, a blow iron is inserted by hand into a quantity of molten glass and a gather of glass is formed on the end of the blow pipe. The blow pipe is then placed in an apparatus which automatically marvers the glass gather and blows it to final form.

One of the objects of this invention is to provide apparatus whereby the glass gather can be marvered accurately to the condition required.

Another object of the invention is to provide a readily adjustable apparatus which can marver gathers in many different ways so as to prepare them suitably for forming a wide variety of articles.

Another object of the invention is to provide an apparatus of this kind for ready and quick substitution of molds of different shapes and of adjustments of the molds to form different articles.

Another object of the invention is to provide for varying the relation of the mold and the blow pipe to suit varying conditions of the glass.

Another object of the invention is to provide apparatus which is readily adjustable to adjust its successive operations to the varying needs of the production of a wide variety of articles.

Another object of the invention is to provide apparatus in which the successive operations may be separately timed and adjusted without interfering with the other operations in the cycle of forming an article.

Further objects and details of the invention will appear as the description proceeds.

In the accompanying drawings forming a part of this specification,

Fig. 2 is a side elevation viewed from the right of Fig. 1, parts being omitted;

Fig. 3 is the section on the line 3—3 of Fig. 2;

Fig. 4 is a detail section on the line 4—4 of Fig. 2;

Fig. 5 is a section on the line 5—5 of Fig. 2;

Fig. 6 is a side elevation viewed from the left of Fig. 1, some parts being omitted;

Fig. 7 is a section on the line 7—7 of Fig. 6, showing air control for the cooler;

Fig. 8 is an enlarged view of the marvering support, viewed from the left of Fig. 6;

Fig. 17 is a detail elevation of a portion of the apparatus for elevating the marver support;

Fig. 18 is a section on the line 18—18 of Fig. 25, showing puff air assembly;

Fig. 19 is a vertical section through the spindle operating drum on the line 19—19 of Figure 1;

Fig. 20 is a horizontal section through the spindle operating drum on the line 20—20 of Fig. 1;

Fig. 21 is a section through the spindle socket on the line 21—21 of Fig. 19;

Fig. 22 is a vertical section across the axis of the spindle operating drum on the line 22—22 of Fig. 2;

Fig. 23 is a section of the drum operating gear on the line 23—23 of Fig. 22;

Fig. 24 is a section of the cooling blower on the line 24—24 of Fig. 1;

Fig. 25 is a plan view of the apparatus with parts removed to show the mold operation;

Fig. 26 is a detail view of one of the operating cylinders;

Fig. 27 is a plan of the mold carrying support;

Fig. 28 is a view of a trip mechanism on the line 28—28 of Fig. 25;

Fig. 29 is a section on the line 29—29 of Fig. 27;

Fig. 30 is a section on the line 30—30 of Fig. 27;

Fig. 33 is a vertical section of the take-out device on the line 33—33 of Fig. 1;

Fig. 34 is a section of the take-out oscillating mechanism on the line 34—34 of Fig. 33;

Fig. 35 is a section of the blow pipe seizing clamp of the take-out device, on the line 35—35 of Fig. 33;

*General arrangement*

Figure 1:
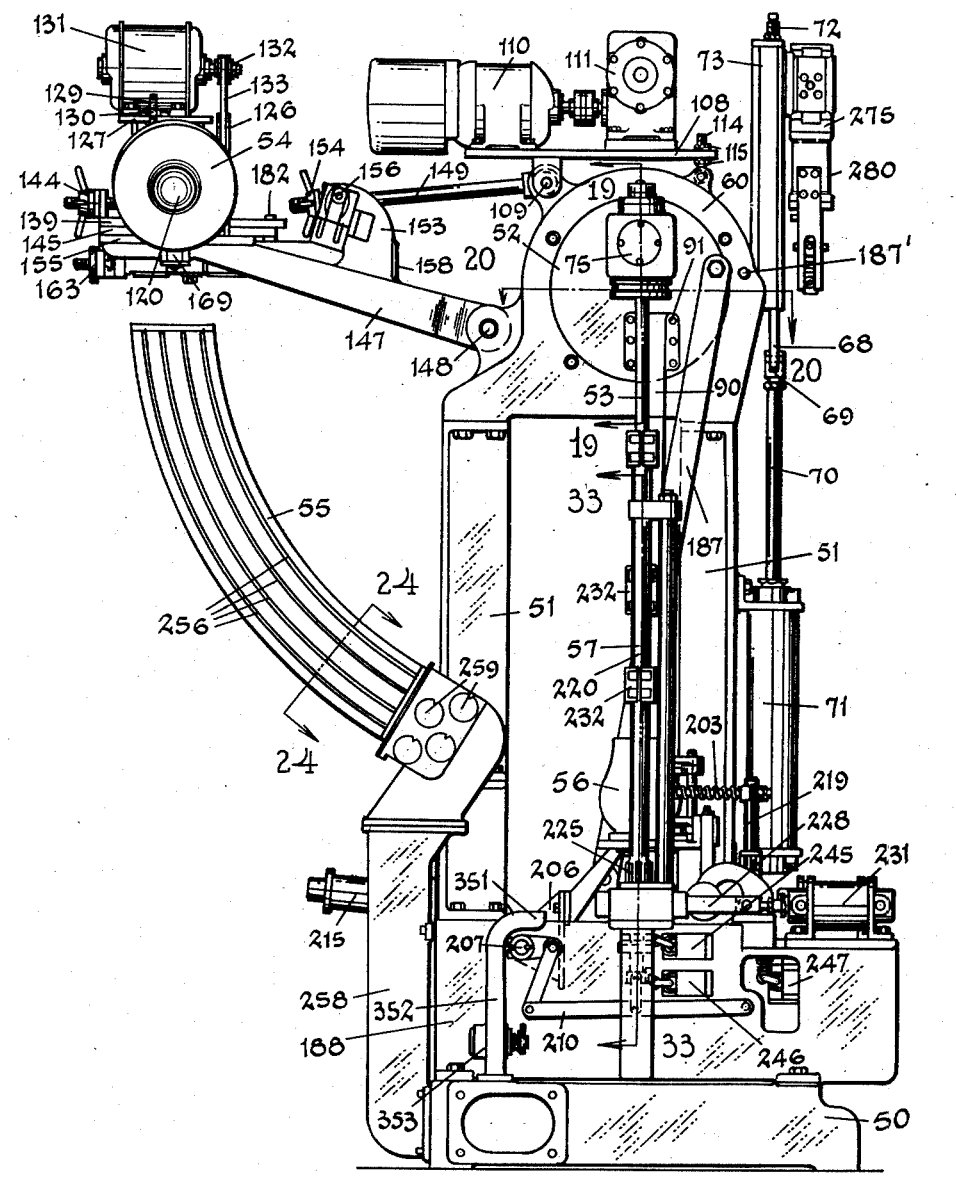
Fig. 1 is a front elevation of the apparatus.
Figure 9:
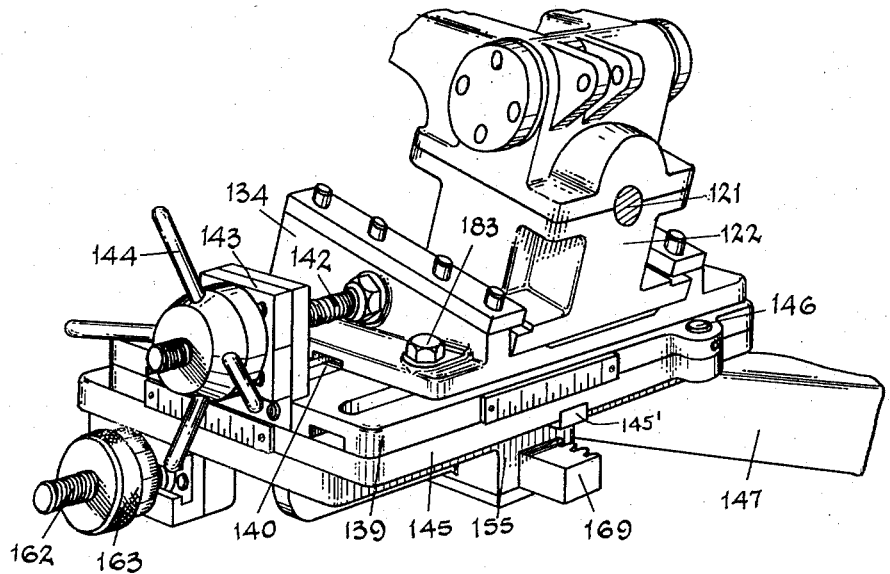
Fig. 9 is an isometric view of a portion of the marvering support, viewed from an angle between Figure 1 and Figure 6.
Figure 10:
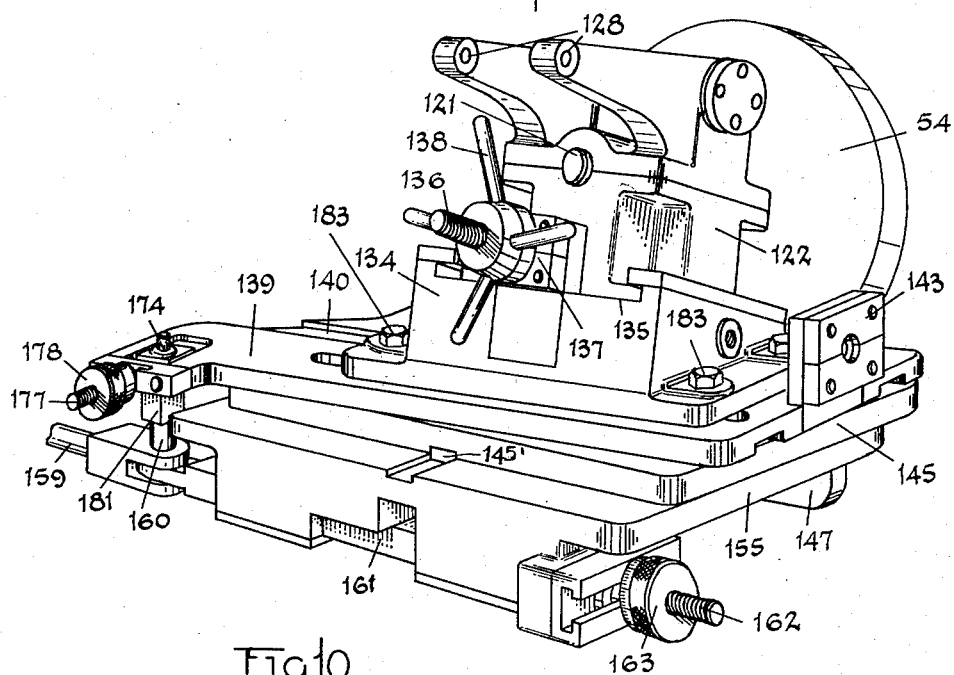
Figure 10 is an isometric view of the portion of the marvering support viewed from an angle between Fig. 6 and Fig. 8.
Figure 11:
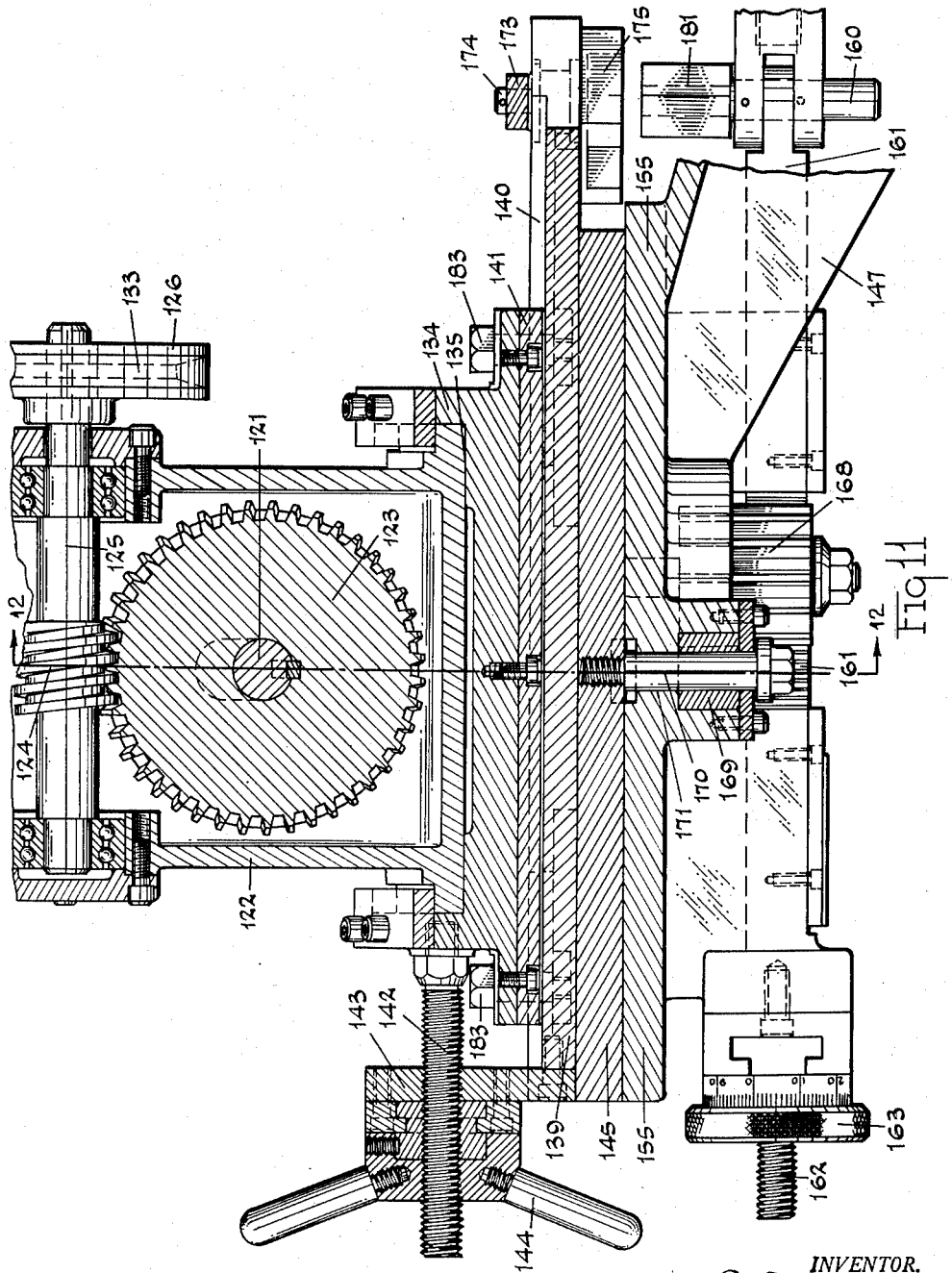
Fig. 11 is a section through the marvering support transversely of the axis of the marver and on the line 11—11 of Fig. 12.
Figure 12:
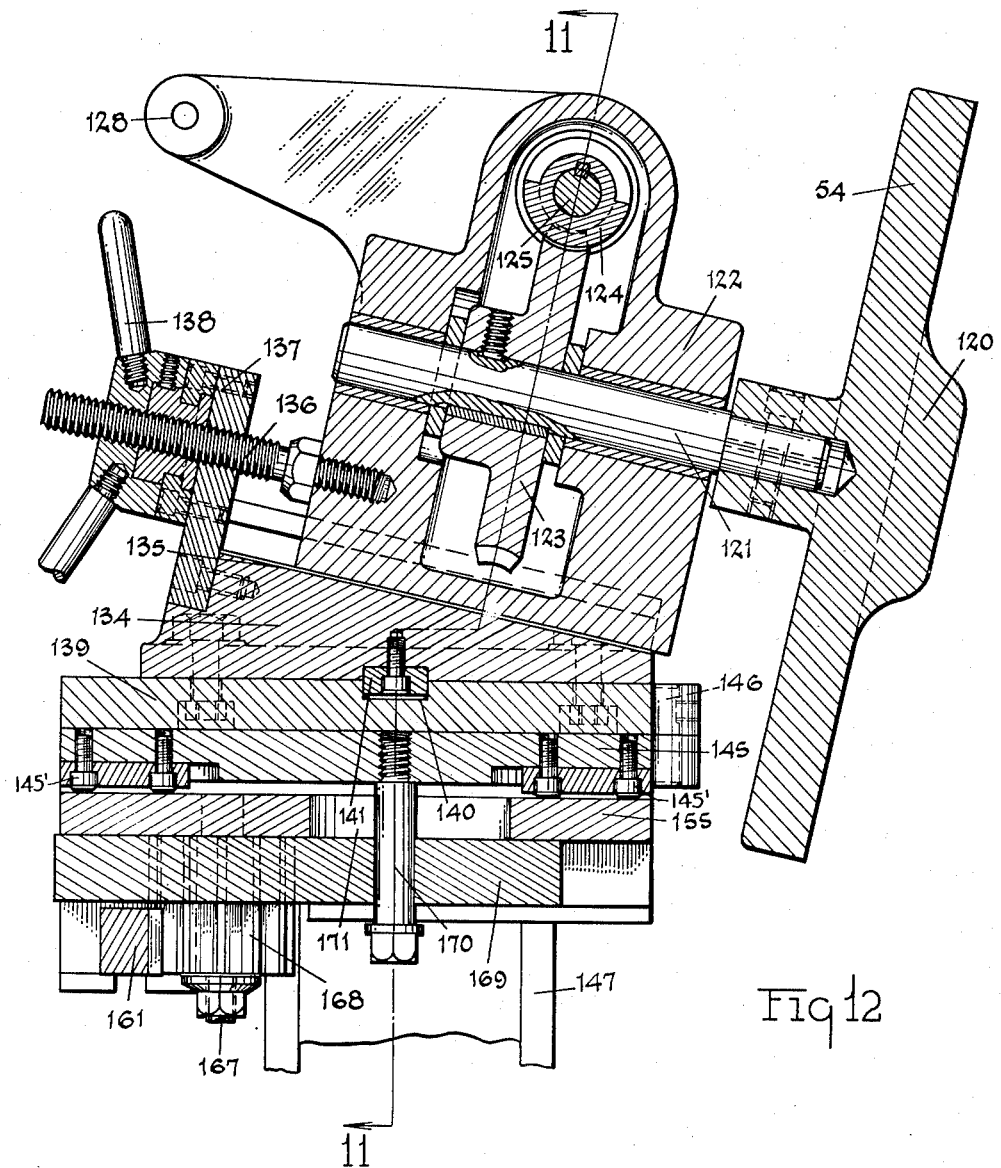
Fig. 12 is a section through the marvering support along the axis of the marver in the line 12—12 of Fig. 11.

The machine disclosed in the drawings is mounted on a base 50 which supports a suitable frame 51. The main parts of the apparatus mounted on that frame comprise a drum 52 which carries a blow pipe 53. A marvering device 54 is shown in position to contact the glass on the end of the blow pipe when the drum is in one position. From that position the glass is swung down past a cooler 55 to a mold 56. There is also provided a take-out device 57 for removing the blow pipe from the mold after the article is blown.

*Drum and blow pipe*

The drum 52 is mounted in a casing 60 on the frame. See Figs. 1, 2 and 19 to 23. In the construction shown there are anti-friction rollers 61 mounted on axes 62 in the casing and contacting the periphery of the drum to hold it in position. Gear teeth 63 are provided on the periphery of the drum. Mounted in the casing adjacent the periphery of the drum there is a shaft 64 on which there is a gear 65 meshing with the teeth on the drum. On the outer end of shaft 64 there is a gear 66 which meshes with a rack 67 carried by a slide 68. The slide is connected by an adjustable connection 69 with the piston rod 70 which is operated by a piston working in cylinder 71. A stop screw 72 is mounted in the top of slideway 73 in which slide 68 works and limits the upward movement of the slide and so determines the arc through which the drum is moved.

On the front of the drum there is mounted a bracket 75. In the upper part of the bracket there is a ball race 76 cooperating with a race 77 attached to a hollow shaft 78, which has a shoulder 79 directly beneath the race. A nut 80 on the shaft holds the race against the shoulder 79. To the top of the bracket there is attached a cover plate 81 provided with a gland 82 for making a tight fit with the upper end of the hollow shaft. A pipe 83 leads into the cover above the shaft.

In the bottom of the bracket there is provided a ring 84 supporting a ball race 85 which cooperates with a race 86 on the lower end of shaft 78. A gland 87 is provided upon the lower end of the shaft for making air-tight connection with the end of a blow pipe. The lower end of the hollow shaft 78 is provided with pawls 88 pressed towards pipe supporting position by springs 89.

An arm 90 is attached to the front of the drum by bolts 91 and carries a vertically adjustable pipe 92. On the lower end of the pipe there is a bracket 93 carrying a holder for the blow pipe shown in detail in Fig. 5. This holder comprises fixed rollers 94 and a movable roller 95 mounted in the end of an arm 96 pivoted to the bracket at 97. There is mounted in the bracket a switch actuating plunger 98 normally pressed against arm 96 by spring 99.

Hollow shaft 78 has affixed thereto a gear 100 adapted to mesh with a bevel gear 101 on shaft 102 mounted horizontally in the bracket and extending into the drum. Within the drum there is a gear 103 on shaft 102 which meshes with a gear 104 on shaft 105 mounted centrally in bearings 106 in the drum. On the rear end of shaft 105 there is a grooved pulley 107. Mounted above the drum there is a plate 108 pivoted to the frame at 109. A motor 110 mounted on the plate 108 is connected to gearing within a box 111 and through this gearing drives a grooved pulley 112 (see Figs. 2, 25) connected by a belt 113 to the pulley 107. A bolt 114 pivoted to the drum casing extends upward through the plate and nuts 115 on the bolt serve to adjust the height of the plate and tighten belt 113 when desired.

*Marverer*

Marver 54 is constructed as a disc with a central protuberance 120 which may be given any desired contour. (See Figs. 1, 6 and 8 to 17.) The marver is mounted upon a shaft 121 journaled in a block 122 and having thereon a worm wheel 123, which meshes with a worm 124 on a shaft 125 mounted transversely of block 122. On the end of shaft 125 there is a grooved pulley 126. A motor supporting platform 127 is pivoted to block 122 at 128. A bolt 129 pivoted to block 122 passes through the platform 127 and carries nuts 130 by which the platform may be adjusted about its pivot 128. A motor 131 mounted on the platform drives a grooved pulley 132 connected by a belt 133 with the pulley 126 on shaft 125 and so drives the marvering plate about its axis.

Beneath block 122 there is a wedging plate 134 provided with a slideway 135 in which block 122 may slide longitudinally of the axis of the marver. A bolt 136 fixed in block 122 passes through a bracket 137 on plate 134 and a hand-wheel 138 on the bolt adjusts the position of the block 122 in slideway 135.

Wedging plate 134 is in turn supported by a plate 139 having a slideway 140 in which plate 134 may be adjusted. The slide connection may be made in any suitable way but in the drawings there is shown a plate 141 bolted to plate 134 and movable in the slideway 140 in plate 139. A bolt 142 fixed in plate 134 extends through a bracket 143 on plate 139 and adjusting hand-wheel 144 on bolt 142 adjusts plate 134 with respect to plate 139.

Plate 139 is supported by a plate 145 and is pivoted thereto at 146. The entire marvering apparatus is supported upon the end of an arm 147 which is pivoted at 148 to the frame 51. A rod 149 is pivoted to the frame 51 at 109 and passes through a block 151 (see Fig. 25) pivoted at 152 in a bracket 153 on the arm 147. An adjusting hand-wheel 154 threaded on rod 149 provides for adjusting the marver supporting arm upward or downward. The supporting plate 145 is mounted upon the outer end 155 of arm 147, to slide transversely of the arm by tongue and groove connection 145', similar to the connection between members 134 and 139, but plate 145 may be fixed to plate 155, as explained below.

A starting switch 156 is mounted upon arm 147 in position to be operated by the head 157 on plunger 98.

Mounted on arm 147 there is a cylinder 158 provided with a piston which operates piston rod 159 connected by a pivot 160 to a rack 161 slidable in plate 155. A stop screw 162 is provided in plate 155 and may be turned by hand-wheel 163 for adjustably stopping the rack 161. The rack carries a pointer 164 and a scale 165 is provided on the plate 155 to readily indicate the point to which the rack is permitted to be moved by the cylinder against the stop 162. (See Figs. 15 and 16.)

A vertical shaft 167 is provided with a gear 168 which is in mesh with rack 161 and also meshes with a rack 169 arranged at right-angles to rack 161. Bolt 170 passes through rack 169 and through a slot 171 in supporting plate 155 and is screwed into plate 145 (see Fig. 12).

Plates 145 and 139 may be linked together as follows. Projecting upwards from plate 145 there is a pin 172 (see Figs. 13 and 14). A link 173 connects pin 172 with a pin 174 on a block 175 which slides in a slot 176 in plate 139. A bolt 177 is fastened in block 175 and is provided on its outer end with an adjusting nut 178 and with a lock nut 179 for securing it in adjusted position. In the lower side of block 175 there is a groove 180. A block 181 on the upper end of pin 160 is positioned in groove 180 when the pin is in its upper position.

Figure 14:
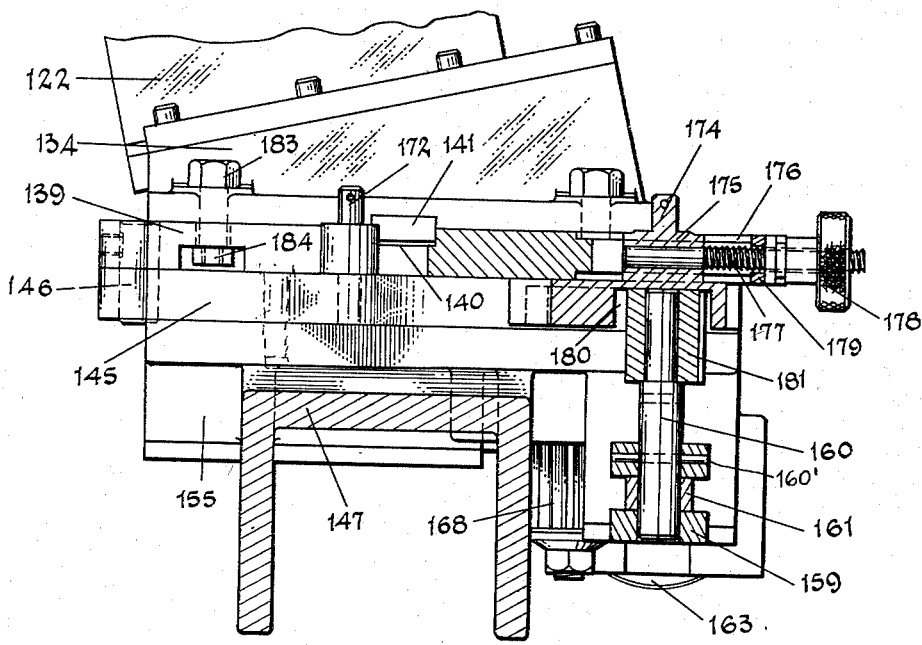
Fig. 14 is a detail of the pivot arrangement of the marvering support on the line 14—14 of Fig. 13.

As will be seen from Fig. 14, pin 160 may be raised as shown in that figure or may be lowered to lower block 181 out of the groove in block 175. When raised, pin 160 may be held up by a removable cross pin 160'.

When desired to lock plates 145 and 155 together, as described below, a removable pin 182 may be inserted in registering holes in plates 145 and 155. (See Fig. 1.)

Figure 15:
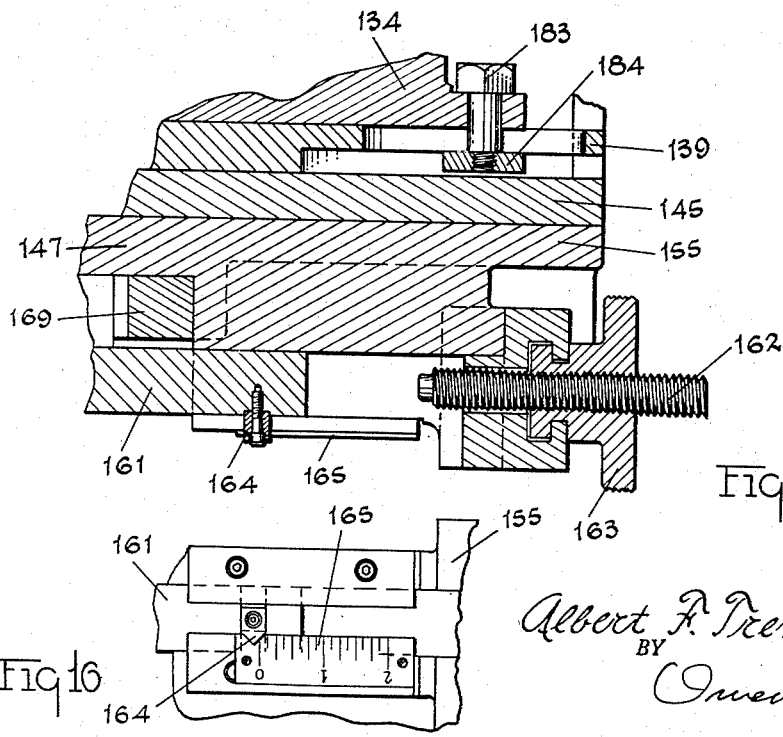
Fig. 15 is a section of adjusting devices for the marvering support on the line 15—15 of Fig. 13.

As will be most readily seen from Fig. 15, there is a pin 183 having a nut 184 sliding in a groove in plate 139 and aligning member 134 with that groove.

Figure 13:
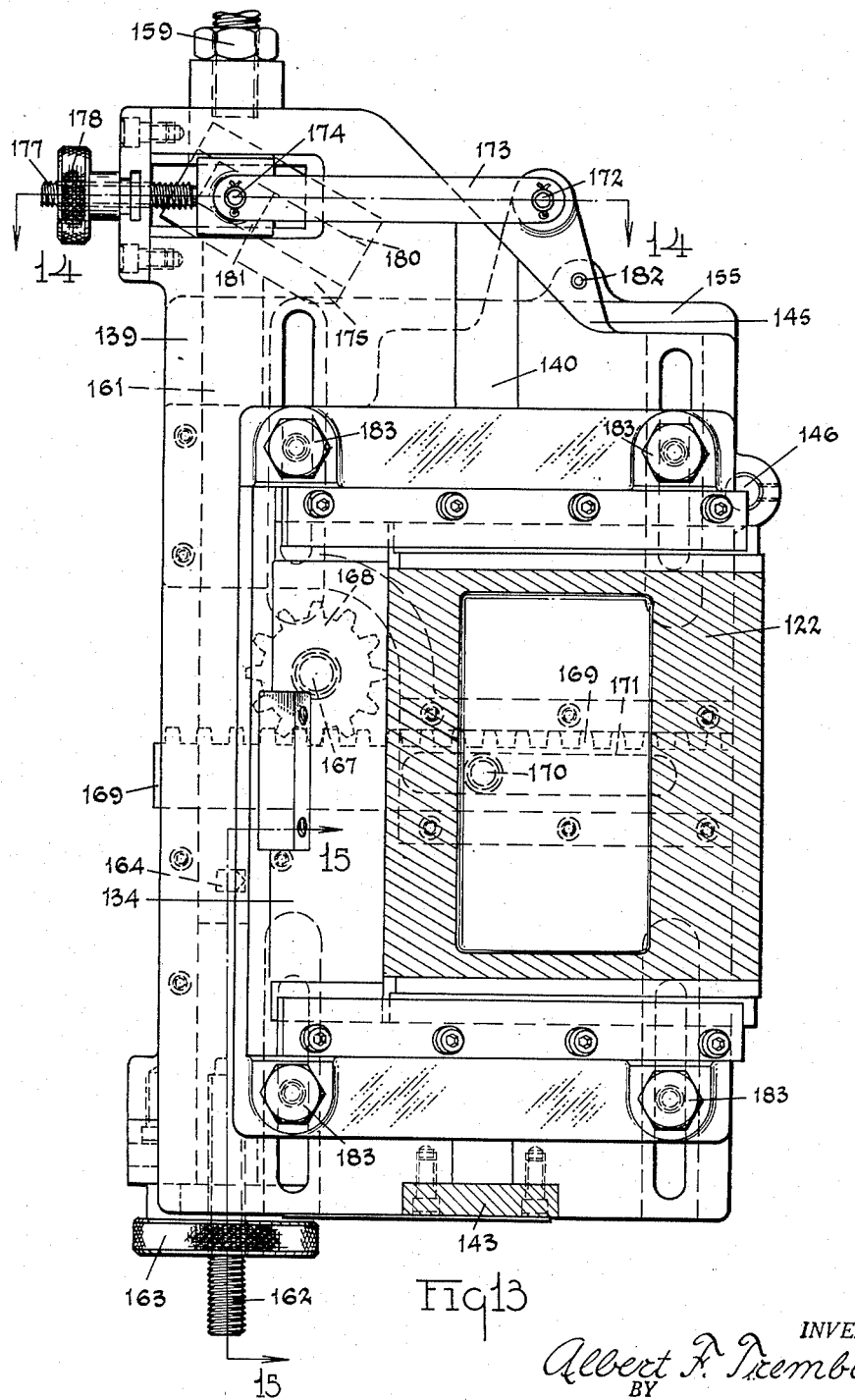
Fig. 13 is a plan view of the marver supporting plates, the marver itself being removed.

Each of pins 183 shown in Fig. 13 operates in the same way, and they slidably secure member 134 to plate 139.

*Mold support and operation*

For the mold there is provided a support 185 mounted on trunnions 186. A link 187 connects the mold support to the drum 52 as appears from Fig. 1. Movement of the drum therefore swings the support about trunnions 186. When the support is swung down, it enters a tank 188 which may be provided with water for cooling the mold. (See Figs. 1, 2, 6, and 25 to 32.) For uses when dipping the mold is unnecessary, link 187 may be released from the drum and attached by a pin 187' to the drum casing, so as to hold the mold support stationary.

The mold support includes a supporting plate 189 on which there is mounted a hinge pin 190 to which the mold halves are hinged, as shown in Figs. 26 and 27. The plate is provided with blocks 191 which are movable vertically in slideways 192 on the mold support by means of screws 193. When the screws are turned by means of heads 194, the blocks and consequently the hinge supporting plate and mold hinge are raised or lowered. (See Fig. 29).

For opening and closing the mold there is provided a slide 195 movable horizontally in a slideway 196. A cylinder 197 is provided with a piston rod 198 having thereon a head 199 in which there is a groove 200. A pin 201 on slide 195 projects into groove 200 when the mold support is in raised position so that the slide may be moved to and fro by movement of the piston. Links 202 from slide 195 are connected to the mold halves and are provided with springs 203 for resiliently closing the mold. Detents 204 are provided for holding slide 195 in either mold opening or mold closing position when it has been moved to such position.

A bottom 205 is provided for the mold and is mounted upon a support 206 which is attached to a rock shaft 207. An arm 208 on the rock shaft 207 is connected by a link 209 with a lever 210 fulcrumed at 211 on the frame. Another arm 212 on rock shaft 207 is pivoted at 213 to a piston rod 214 operated by a cylinder 215 which is mounted upon pivots 216. It will be seen that operation of the piston rod by the cylinder rocks shaft 207 and operates the parts attached thereto.

As indicated at 217, the mold bottom is vertically adjustable on support 206. The mold supporting plate 189 is vertically adjustable by turning screws 193, as described above, and the mold-closing links 202 are connected to the slide 195 through a crosspiece 218 on that slide and pins 219 at the ends of the crosspiece and on which the links may be vertically adjusted. Preferably the lower ends of screws 193 are provided with sprockets 318 connected by a chain 319 so that turning one results in turning the other equally.

*Take-out*

As will appear from Figs. 1 and 33 to 35, there is provided a take-out shaft 220 which has at its lower end a collar 221 provided with pins 222. Links 223 connect pins 222 to a pivot pin 224 through lever 210.

Shaft 220 is provided with long vertical teeth 225 slidable through a pinion 226 mounted in a bracket 227. Slidable in the bracket and in mesh with the pinion there is a rack 228. A piston rod 229 pivoted at 230 to rack 228 is operated by a cylinder 231. Just above the mold and near the upper end of the take-out shaft there are two take-out arms 232, each provided with a clamp. A cylinder 234 in the arm is provided with a piston 235 carrying a rigid jaw 236 and a jaw 237 pivoted to the arm at 238. A spring 239 is provided for normally closing pivoted jaw 237, and the end of jaw 237 is provided with a cam surface 240. A spring 241 is provided for normally retracting the piston when not overcome by pressure within the cylinder, the spring being attached to a pin 242 passing through a slot 243 in the cylinder 234. The jaws 236 and 237 fit into a groove in collar 339 fixed on the blow pipe, so as to prevent relative longitudinal movement of the blow pipe and shaft 220 when the clamp is closed on the collar.

Figure 32:
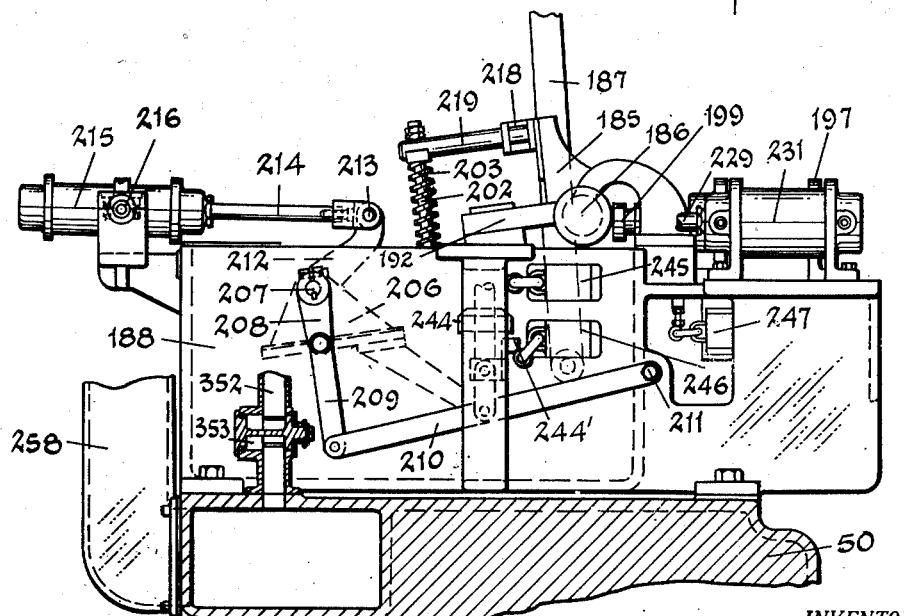
Fig. 32 is a sectional view somewhat similar to Fig. 31, but showing additional parts and indicating their operative relationship.

As most clearly seen in Figs. 1 and 32, shaft 220 is provided with a collar 244 which when raised operates a limit switch 245, whereas the lowering of the shaft operates a limit switch 246 by means of a lug 244' mounted on shaft 220 below collar 244 (see Figs. 32 and 36) for purposes which will be described later. As will be most clearly seen from Fig. 28, there is provided a limit switch 247 having an operating arm 248 in contact with the lower end of an adjustable plunger 249, normally pressed upward in a cylinder 250 by means of a spring 251. An operating plate 252 pivoted at 253 is adapted to be contacted by a beveled edge 254 on piston head 199 when the piston is retracted.

*Cooling air*

As will most clearly appear from Figs. 1, 7 and 24, there is provided a cooling air box 55 for projecting cooling air upon the parison while it moves from the marver to the mold. This box is provided with slits 256 leading from separate compartments 257 which are supplied with air from a common supply pipe 258 through valves 259 which may be adjusted to supply to each compartment the amount of air desired.

*Blowing air supply*

As will be seen from Figs. 3 and 4, there is provided adjacent the drum 52 a valve 260 having a passage therein 261 and a groove 262 and mounted in a casing 263. The casing is provided with ports 265, 266 and 267 with which the passage and groove connects in various ways as the plug is turned. The plug 260 is also provided with notches 268 with which there cooperates a positioning ball 269 pressed by a spring 270 into the notches to hold the plug in either of two positions when it is moved to such positions.

The plug is provided with a fork arm 271 which is in position to be engaged by a pin 272 on the drum 52 for shifting the valve.

Mounted on the frame there is an air controlling apparatus comprising a cylinder 275, as shown in Fig. 18, provided with a piston 276. The piston is operable by means of a reversing valve 277, which alternately moves the piston in opposite directions. Piston 276 is connected by a rod 278 to piston 279 in cylinder 280. Another piston 281 in cylinder 280 is mounted upon the end of an adjusting bolt 282 threaded through the end 283 of cylinder 280. The bolt is provided with a handle 284 for adjusting piston 281 to the desired position. The bolt is hollow and constitutes a pipe connected by swivel joint 285 to a connection 286 from which a pipe 287 leads to pipe 83 and the chuck of the blow pipe. A pipe 287' leads from the upper end of cylinder 280 to join pipe 287 and deliver air to pipe 83. The upper and lower ends of cylinder 280 are connected to the open air through inwardly opening check valves 273 and 274, and outwardly opening check valves 273' and 274' in pipes 287' and 287 respectively insure a double pumping action upon the reciprocation of piston 279.

A check valve 273 admits air into the upper end of cylinder 280 when piston 279 moves downward, and a check valve 274 admits air into the lower end of cylinder 280 when piston 279 moves upward. Check valves 273' and 274' in pipes prevent return of air from pipes 287 or 287' into cylinder 280.

*Operation of apparatus*

Figure 36:
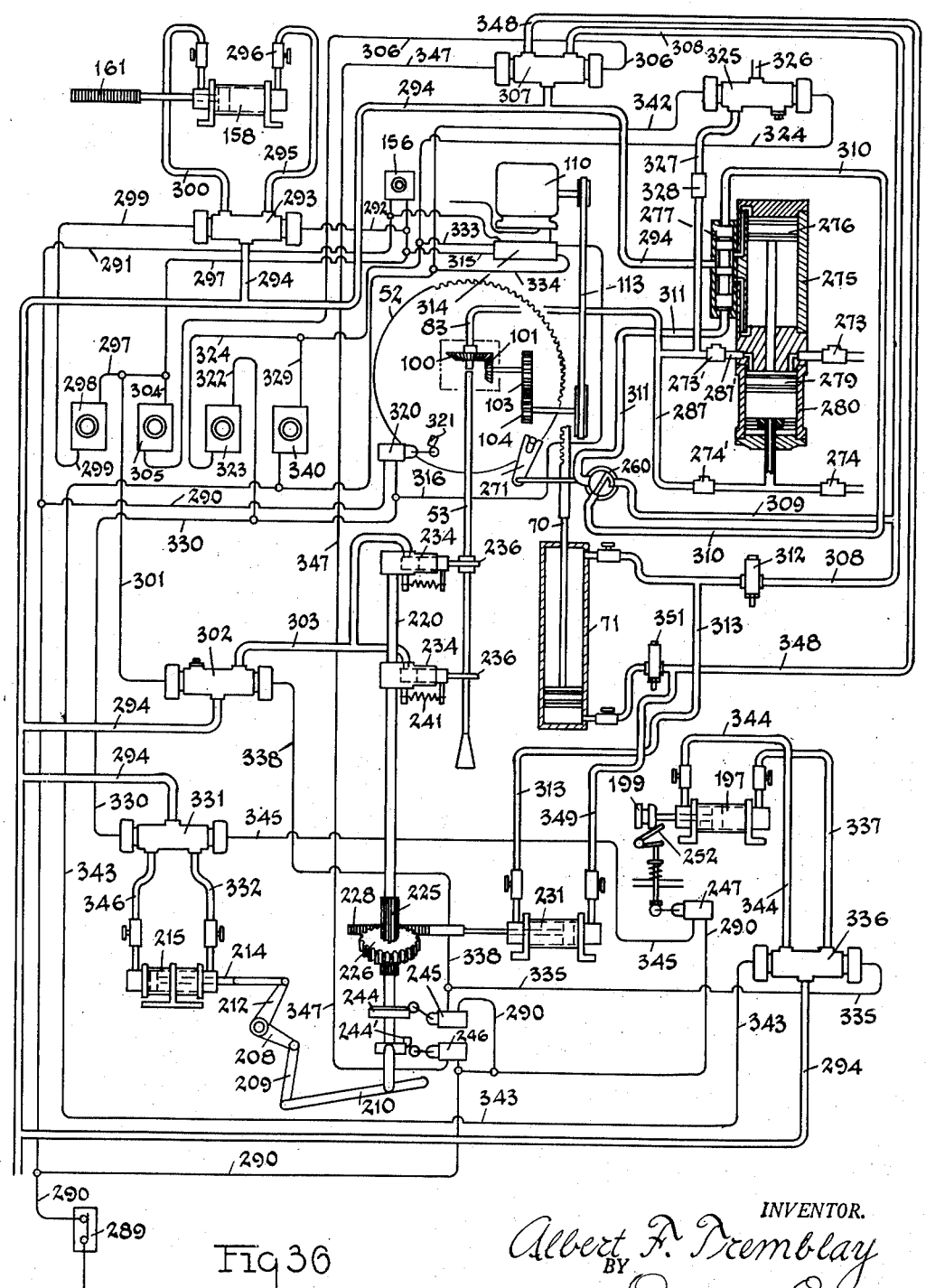
Fig. 36 is a diagrammatical view of the air control and timing mechanism for the apparatus.

The operation of the apparatus will be described in connection with Fig. 36 which shows diagrammatically the connection of the control parts. The operation of the apparatus is initiated by a switch 156 mounted on arm 147 in position to be contacted by the head 157 on plunger 98 when a blow pipe is positioned in the holder, which is arranged at an angle so that the member 157 will contact the switch when a blow pipe is inserted in the holder in the normal starting position of the machine. A main switch 289 which is manually controlled will normally be closed during the automatic operation of the apparatus, but may be employed to stop the operation at any time or to energize any portion of the cycle temporarily during setting up or adjusting the apparatus. The marver turning motor 131 is constantly energized during the operation of the apparatus and is controlled only by the main switch 289 and therefore the connections are not indicated on Fig. 36.

*Operation of the marver device*

It will be readily understood that when the blow pipe is inserted in the machine it will have a gather of glass on its outer end positioned so as to be contacted by the marvering plate. However, the parts are so adjusted that the glass contacts the marvering plate only on the half of that plate nearest to the drum. This has an advantage which will be discussed later.

When the main switch 289 is closed, line 290 is energized and this line leads through branch 291 to starting switch 156, and when the switch is operated by member 157 connection is made between branch 291 and a line 292 which leads to a solenoid operated valve 293. A constant supply of air under pressure is led to the valve through a pipe 294 from any suitable source of supply. When the solenoid is energized by line 292, the valve opens communication between pipe 294 and pipe 295 which leads through a control valve 296 to cylinder 158 which operates the marvering device. Valves similar to 296 are provided for controlling and timing the speed of operation of the various air cylinders and may be adjusted in a well-known way to control the speed of operation of the cylinders and need not be mentioned in connection with the other cylinders and pipe lines.

It will be readily understood that the marver carrying arm 147 is adjusted by hand-wheel 154 so as to bring the marvering plate at the proper height with respect to the blow pipe. The supporting member 122 and plates 134 and 139, as has been described, are obviously adjustable to move the marver in all directions horizontally, and may be adjusted by wheel 138 to bring the marvering plate nearer to or farther from the axis of the blow pipe and also can be adjusted by wheel 144 longitudinally of the blow pipe so that contact will be made exactly where desired. The marver support is constructed to operate in two different ways. In one of these ways the marver support is swung so as to oscillate the outer edge of the supporting plate 139 towards and from the axis of the blow pipe. In the other way the entire plate is moved rectilinearly towards and from the axis of the blow pipe.

Figure 16:
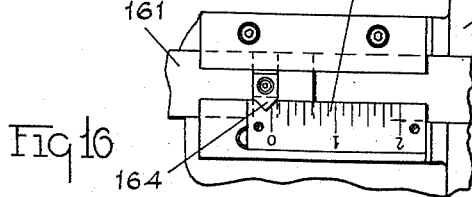
Fig. 16 is a detail showing a scale for indicating the adjustment of the marver support, viewed from the underside of Fig. 15.
Figure 31:
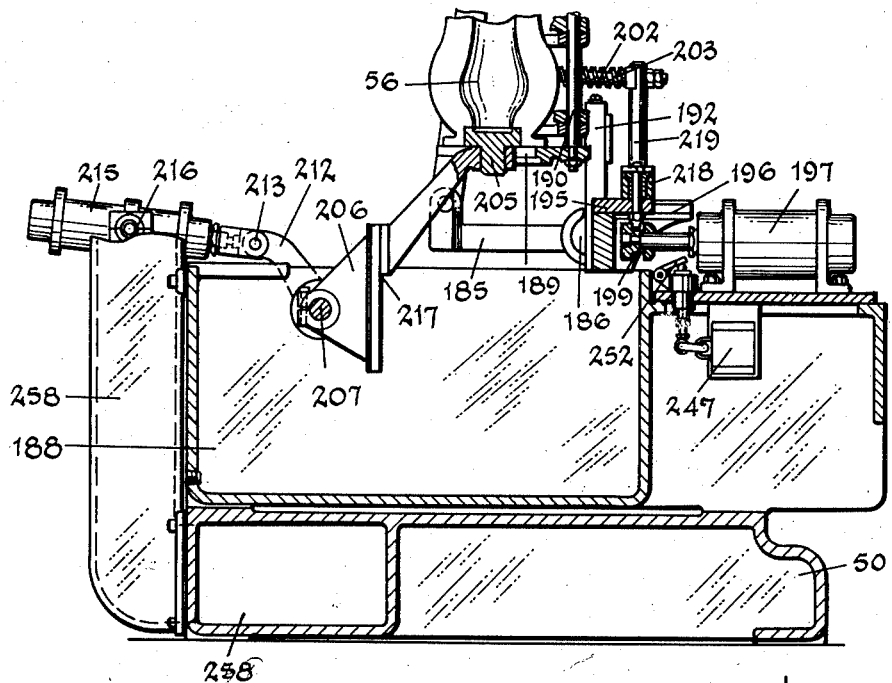
Fig. 31 is a section on the line 31—31 of Fig. 25, showing the relation of the support for the mold sides and the support for the mold bottom.

When bolt 170 is removed and rack 169 is disconnected from plate 145, that plate may be fixed in position on plate 155 by pin 182, block 181 is raised and link 173 removed, as shown in Fig. 14. Thereupon the operation of the piston in cylinder 158 moves the connecting pin 160 in the block 181 and swings plate 139 about pivot 146 connecting it to stationary plate 145. The length of the stroke is adjusted in accordance with the position indicated by pointer 164 on scale 165, as shown in Fig. 16. Block 181 moves in slideway 180, and adjustment of block 175 by nut 178 adjusts the position of plate 139 about pivot 146.

When it is desired to move the entire marvering plate rectilinearly to and from the axis of the blow pipe, plate 145 is freed from supporting plate 155 by removal of pin 182, and plates 145 and 139 are linked together by link 173. Bolt 170 is then inserted and connects rack 169 with plate 145 and block 181 is lowered, as in Figs. 11, 12 and 13. Thereupon the movement of the piston rod 159 moves rack 161 and rotates gear 168 and through the upward extension of that gear moves rack 169 and the connected plates 145 and 139 towards and from the axis of the blow pipe.

It will be seen that in this way the marvering action can be exerted on the entire length of the glass on the blow pipe evenly, or after the initial contact the plate may be swung so as to point the gather of glass. Also, by adjusting the length and speed of the stroke, the extent to which either of these operations is carried is readily adjusted to suit the characteristics desired in the gather for making the particular type of glassware for which the apparatus is being adjusted.

Timer 298

Line 292 has a branch 297 leading from line 292 to a timer 298. After a predetermined time, the timer connects this line with a line 299 to valve 293 which reverses the valve and connects pipe 294 with pipe 300 leading to the end of cylinder 158 where pressure retracts the piston and returns the marvering support to its original position.

Another branch 301 from line 297 leads to a solenoid controlled valve 302 and operates that valve so as to allow exhaust through a pipe 303 from cylinders 232, and this allows springs 241 to retract the take-out clamps.

Puff air

A still further branch 304 from line 297 leads to timer 305. After the time for which timer 305 is set, it energizes lead 306 to valve 307 and operates that valve to direct air under pressure through a pipe 308 which leads to cylinder 71, thus oscillating the drum to swing the blow pipe to vertical position. A branch 309 from pipe 308 leads to valve 260 which is normally set so as to provide passage from this branch line 309 to a pipe 310 which leads to one end of reversing valve 277 for cylinder 275. This moves the valve so as to direct air under pressure from pipe 294 to the end of cylinder 275 which moves the piston therein downward and forces air through pipe 287 into the blow pipe for producing a puff of air in the glass on the blow pipe.

It is preferable that this puff occurs while the blow pipe is in horizontal position and therefore the pipe 308 to cylinder 71 is provided with a sequence valve 312. A spring in this valve prevents the opening thereof until valve 277 has been shifted and sufficient pressure is built up in the line to overcome the spring. By this means air will not be introduced into cylinder 71 to swing the drum and the blow pipe thereon until the initial puff of air has been blown into the glass.

As the drum is oscillated to swing the blow pipe into vertical position, a pin 272 on the drum oscillates valve 260 and directs air under pressure from pipe 309 through pipe 311 to the other end of valve 277, reversing the valve and thereby directing air to the other end of cylinder 275. This raises piston 279 and forces another puff of air through branch 287' and pipe 287 to pipe 83 leading into the blow pipe. Cylinder 280 is connected to the air through check valves 273 and 274, which admit air but prevent is free escape, so that cylinder 280 and piston 279 operate as a double acting pump. It will be seen that this second puff of air is delivered just as the blow pipe becomes vertical. Valve 260 is returned to its original position when the drum is oscillated to move the blow pipe holder to receiving or starting position.

Another branch 313 from pipe 308 leads to cylinder 231 and swings fingers 232 towards the blow pipe, as the pipe is brought to vertical position.

Control of blow pipe rotation

A switch 314 is provided for starting and stopping motor 110 by which the blow pipe is rotated on its axis. A lead line 315 from switch 156 to switch 314 starts motor 110 when the blow pipe is placed in position and switch 156 is operated. There is also provided a lead line 316 from switch 314 to a limit switch 320 which results in stopping motor 110 when block 321 on drum 52 operates the limit switch. Thus the rotation of the blow pipe is started immediately after it is placed in position in the machine and continues during marvering and until it is substantially in vertical position, when it is stopped temporarily.

Other operations caused by switch 320

There is a lead line 322 from switch 320 to a timer 323. This timer after a predetermined interval energizes line 324 which leads to solenoid operated valve 325 and causes it to connect a supply pipe 326 for compressed air with a pipe 327 which leads through a control valve 328 to pipe 287' leading to the blow pipe. In this way the final blowing air is supplied to the blow pipe a predetermined time after timer 323 has been actuated. A branch 329 from line 324 leads to a timer 340.

Another line 330 leads from switch 320 to a valve 331 and actuates the valve to direct compressed air through pipe 332 to cylinder 215, which actuates rock shaft 207 and raises the mold bottom and also the take-out shaft. The mold support is swung by its connection to the drum so that the mold is raised from the tank into molding position, but of course still open, at the time the blow-pipe reaches vertical position. Another line 333 from timer 323 leads to switch 314 for starting the rotation of the blow pipe during the final blowing of the article and a line 334 from timer 340 to switch 314 stops the rotation of the blow pipe at the time set for timer 340.

Operations initiated by switch 245

When the take-out shaft is raised by operation of cylinder 215, limit switch 245 is operated and energizes a line 335 to a solenoid controlled valve 336. This shifts the valve to connect air under pressure to pipe 337 leading to cylinder 197 and projecting the mold closing piston. A branch 338 from wire 335 leads to valve 302 and actuates it to direct air through pipe 303 and project the take-out clamps about the blow pipe.

Operation of timer 340

At the expiration of the time for which timer 340 is set, in addition to stopping the rotation of the blow pipe through a line 334, the timer through a line 342 actuates valve 325 to reverse its position and stop the introduction of air into the blow-pipe. Through another line 343 the timer actuates valve 336 to introduce air through a pipe 344 to cylinder 197 for opening the mold. When the mold is opened it actuates limit switch 247. A line 345 from limit switch 247 to valve 331 reverses that valve and introduces pressure through pipe 346 to cylinder 215 for lowering the take-out shaft and the bottom of the mold. This lowering of the take-out shaft actuates limit switch 246 and through a line 347 from switch 246 to valve 307 it reverses the valve and introduces pressure into pipe 348 and the lower end of cylinder 71. Through a branch 349 from line 348 air is directed into cylinder 231 for swinging the blow pipe away from the machine. It will be understood that the blow pipe held by the clamping fingers of the take-out device is lowered when the take-out shaft and mold bottom are lowered so that it is in position to be swung when the take-out shaft has reached its lower position. A sequence valve 351 is provided in line 348 so that the drum will not be swung and the mold dipped into the tank until the blow pipe and the ware thereon have been swung out of the way. The operation of cylinder 71 then returns the drum to its original position ready to receive another blow pipe with the gather of glass thereon, so that the operation may be repeated.

As noted above, the apparatus is so adjusted that the glass contacts the side of the marver which is nearest the drum. The marvering plate and the blow pipe are rotated in such relative directions as to reduce sliding action of the glass on the marvering plate to a minimum. In the majority of cases the gather of glass is marvered into a somewhat conical shape with the point at the outer end. The parts are so positioned and adjusted that the speed of the surfaces of the glass and marvering plate will vary from end to end of the glass in approximately similar proportion so that there is a substantially rolling action of the glass on the plate during the marvering operation.

The arm supporting the marvering device may be adjusted about its pivot 148, and stop screw 72 may be adjusted accordingly, so that the angle of the blow pipe may be adjusted as desired during the marvering. By adjustment of valves 259 air may be blown from any one or more of the slits 256 to cool the parison while it is swinging down to the mold, so that the cooling of different portions of the glass may be accurately controlled at this time, and the shape and temperature of different portions of the parison correctly suited to the needs of the particular article to be produced.

The operation described is suitable for blowing articles in paste molds. If it is desired to blow the ware without rotation during blowing, the switches for starting and stopping the blow pipe at the beginning and end of the blowing operation may be thrown out of action by suitable means. In this case, it may not be necessary or desirable to dip the mold, and link 187 may be detached from the drum and attached to pin 187' on the frame, this maintaining the mold holder in raised position.

In practice there will ordinarily be several machines arranged together, but as each machine can be stopped and started independently and will operate independently, the description of one machine suffices for all.

It will be seen that provision has been made for adjusting the position of the marvering plate and its action during marvering so as to provide for properly marvering a wide variety of gathers for producing different articles, and the change from one article to another may be made quickly and simply.

When the blowing is completed and the mold opened, the automatic take-out device swings the blow pipe to a position which not only clears the path of the mold into the cooling tank, but also positions the newly blown glass over a cooling jet from an air outlet indicate at 351. (See Fig. 1). The air may be supplied to this outlet by a branch 352 from supply pipe 258. The flow of air may be controlled by a valve 353. (See Fig. 32.) The outlet 351 may be shaped as desired to direct the air in the proper manner upon the particular article being manufactured. By this arrangement, each article is brought in a regular manner at a predetermined time in a predetermined way over a cooling jet of predetermined character, so that the cooling is effected in a uniform and suitable manner. This enables the blown article to be removed from the mold more promptly than could otherwise be done without endangering the desired uniformity of the articles produced due to deformation after removal from the mold.

Likewise, the mold has been made vertically adjustable by which means not only can ware of different lengths be produced readily, but also an important feature is that the mold can be adjusted slightly in a vertical direction by turning screws 193, without stopping the machine, to bring the top of the mold nearer or farther from the blow-pipe during the operation of the machine. This is quite advantageous since slight changes in temperature or condition of the glass renders it desirable to have a greater or lesser distance between the end of the blow-pipe and the top of the mold.

While the exact construction disclosed in the drawings operates desirably, it will be readily understood that many details may be changed within the scope of the appended claims while retaining advantages gained by the features and combinations specified in the claims.

What I claim is:

1. A glass blowing machine of the semi-automatic type comprising a holder for a blow pipe, means to rotate a pipe in the holder, means to supply blowing air to a pipe in the holder, a drum supporting the holder, means to oscillate the drum to move a pipe in the holder between an approximately horizontal marvering position and an approximately vertical position, a marvering device in position to marver a gather on the pipe in marvering position, a partible blow mold, means to open and close the mold, a support for the mold, a cooling tank, connections from the drum to the mold support moving the mold into the tank when the holder is moved to marvering position and moving the mold to position to enclose a gather on the pipe when the holder and pipe are moved to blowing position, a mold bottom, a vertical shaft carrying take-out arms, common means for raising and lowering the mold bottom and shaft, means to swing the shaft to move the arms between a position in which they extend towards the blowing position of the pipe to a position at one side thereof, clamps on the ends of said arms, means to extend the arms to make the clamps engage a blow pipe, means to retract the arms, and control means automatically starting the marvering operation of said marvering device when a pipe is inserted in a holder and continuing the operation of the drum, blowing means, mold and take-out device in timed sequence until the blow pipe with a blown article thereon is swung to one side by the take-out arms.

2. In combination, a blow pipe holder, a marvering disc, means to rotate a pipe in the holder, means to rotate the disc, means mounting the disc with its axis approximately normal to the axial line of the pipe, and means to reciprocate the disc on its mounting towards and from the axis of the blow pipe in a right line.

3. In combination, a blow pipe holder, a marvering disc, means to rotate a pipe in the holder, means to rotate the disc, means mounting the disc with its axis approximately normal to the axial line of the pipe, means to adjust the disc on its mounting towards and from the axial line of the blow pipe, and means to reciprocate the disc towards and from the axial line of the pipe during each marvering action.

4. In combination, a blow pipe holder, a marvering disc, means to rotate a pipe in the holder, an axle and bearing for the disc means to rotate the axle, means mounting the bearing with its axis approximately normal to the axial line of the pipe, means to adjust the position of the bearing independently in three directions approximately normal to each other and means to reciprocate the bearing and disc towards and from the axial line of the blow pipe during each marvering operation.

5. Apparatus in accordance with claim 4 and the reciprocating means comprising means to move the disc in a right line.

6. Apparatus in accordance with claim 4 and the reciprocating means comprising means to move the disc in an arcuate line to point the gather.

7. In combination, a blow pipe holder, means to rotate a pipe in the holder, means to oscillate the holder to swing a pipe therein from a marvering position to a blowing position, a plate mounted adjacent the end of a pipe in the holder in marvering position, a second plate slidably adjustable on the first said plate in a direction approximately parallel with the axial line of said pipe in marvering position, a marvering disc, means to rotate the disc, and a mounting for the disc and its rotating means slidably adjustable on the second said plate in a direction approximately normal to the axial line of said pipe.

8. In combination, a blow pipe holder, means to rotate a pipe in the holder, means to oscillate the holder to move a pipe therein from marvering position to blowing position, a support adjacent a gather on the pipe in marvering position, a marvering disc, means to rotate the disc, a mounting for the disc and its rotating means slidably mounted on said support, and means to reciprocate the mounting on the support to move the disc to and from the axial line of the pipe during each marvering action.

9. Apparatus in accordance with claim 8 and the last said means comprising a gear mounted in the support and in mesh with a rack on said mounting, a rack in mesh with the gear and slidable in the support, and means to reciprocate the last said rack.

10. Apparatus in accordance with claim 8 and the last said means comprising a gear mounted in the support and in mesh with a rack on said mounting, a rack in mesh with the gear and slidable in the support, means to reciprocate the last said rack, and an adjustable stop limiting the movement of the last said rack in the direction to move the mounting towards said axial line.

11. A glass blowing apparatus of the semi-automatic type comprising a holder adapted to receive a blow pipe with a gather thereon, means to move the holder to swing a blow pipe therein from marvering position to blowing position, means providing a plurality of slits parallel with each other and with the path of movement of glass on the pipe as it is swung between said positions, said slits being in position to direct air towards said path, and separate means to control the supply of cooling air to said slits.

12. A glass blowing machine of the semi-automatic type comprising a holder adapted to receive a blow pipe with a gather thereon with the holder in one position, a marvering device adapted to marver the glass on a blow pipe with the holder in said receiving position, means to swing the holder and blow pipe held thereby to position the blow pipe substantially vertically for blowing, a blow mold, means to close the mold about the gather in blowing position, means to introduce air into the blow pipe, and separate controls independently adjustable during the operation of the machine for determining independently the duration of marvering, swinging and final blowing.

13. Apparatus in accordance with claim 12 and the marvering device comprising an air cylinder and piston for moving the marver to and from the gather during marvering, a valve for adjusting the speed of movement of said piston, and a stop for adjusting the extent of movement of said piston.

14. Apparatus in acordance with claim 12 and the holder swinging means comprising an air cylinder and piston for swinging the blow pipe holder from marvering position to molding position, a valve for adjusting the speed of movement of said piston, and an adjustable stop limiting the extent of movement of said piston.

15. Apparatus in accordance with claim 12 and the final blowing control comprising means to start the final blowing and a separately adjustable timer for stopping the blowing a predetermined time after it starts.

ALBERT F. TREMBLAY.

REFERENCES CITED

The following references are of record in the file of this patent:

UNITED STATES PATENTS

| Number | Name | Date |
|---|---|---|
| 292,765 | Russell | Jan. 29, 1884 |
| 1,124,702 | Chamberlin | Jan. 12, 1915 |
| 1,156,858 | Chamberlin | Oct. 12, 1915 |
| 1,401,713 | Lecoultre | Dec. 27, 1921 |
| 1,410,803 | Gray et al. | Mar. 28, 1922 |
| 1,497,332 | Hartman | June 10, 1924 |
| 1,894,576 | Tremblay | Jan. 17, 1933 |
| 2,202,100 | Grant | May 28, 1940 |

FOREIGN PATENTS

| Number | Country | Date |
|---|---|---|
| 445,741 | France | Sept. 11, 1911 |